United States Patent [19]
Kovalick et al.

[11] Patent Number: 5,485,553
[45] Date of Patent: Jan. 16, 1996

[54] METHOD AND APPARATUS FOR MANAGING AND INITIATING VIDEO CAPTURE AND PRINTING

[75] Inventors: Albert W. Kovalick, Santa Clara; Gregory E. Lowitz, Redwood City, both of Calif.

[73] Assignee: Hewlett-Packard Company, Palo Alto, Calif.

[21] Appl. No.: 143,046

[22] Filed: Oct. 29, 1993

[51] Int. Cl.$^6$ .............................. G06F 15/00; H04N 5/84
[52] U.S. Cl. ............................................. 395/106; 358/345
[58] Field of Search ....................... 358/311, 479, 358/160, 345; 348/552, 460, 465, 719, 722, 739; 360/14.1, 14.2, 14.3; 395/106

[56] References Cited

U.S. PATENT DOCUMENTS

| | | | |
|---|---|---|---|
| 4,858,027 | 8/1989 | Sashou | 358/311 |
| 4,920,423 | 4/1990 | Shiota | 358/335 |
| 4,969,042 | 11/1990 | Houtman | 358/160 |
| 5,023,727 | 6/1991 | Boyd | 358/310 |
| 5,043,829 | 8/1991 | Hahn | 360/14.1 |
| 5,179,449 | 1/1993 | Doi | 358/311 |
| 5,251,074 | 10/1993 | Hamma | 360/14.1 |
| 5,274,463 | 12/1993 | Matsumoto | 358/335 |

FOREIGN PATENT DOCUMENTS

| | | |
|---|---|---|
| 0462784 | 12/1991 | European Pat. Off. . |
| 0516319 | 12/1992 | European Pat. Off. . |
| 2054315 | 2/1981 | United Kingdom . |

OTHER PUBLICATIONS

"CP–110U Color Video Printer", Mitsubishi Electronics America, Inc., Somerset, New Jersey, 1991.
"CP–210U Large Format Color Video Printer", Mitsubishi Electronics America, Inc., Somerset, New Jersey, 1992.
"UP–5100/UP–5150 Color Video Printer", Sony Corporation (4 pages) and labelled Feb. 1992.
"Near Photographic Quality Color Prints From a Variety of Video Sources", describing a UP–3000 color video printer vailable from Sony Corporation, and bearing no publication date.

Primary Examiner—Sandra L. O'Shea
Assistant Examiner—John Ning

[57] ABSTRACT

The present invention is directed to reversing the trend in conventional video printing by providing a cost-effective, flexible device which is independent of the printing device and which can respond to any of numerous highly accurate trigger signals for capturing a video image. Exemplary embodiments can be used with any conventional computer printing device to provide plain paper prints of video images. By focusing on optimizing cost-effectiveness and system flexibility rather than providing high resolution photographic quality prints, the present invention can provide video printing features never before realized. Exemplary embodiments of the present invention relate to a method and apparatus for processing an input video data stream by receiving the input video data stream, and by automatically controlling processing of at least a portion of a video frame in response to a predetermined condition of the input video data stream.

16 Claims, 4 Drawing Sheets

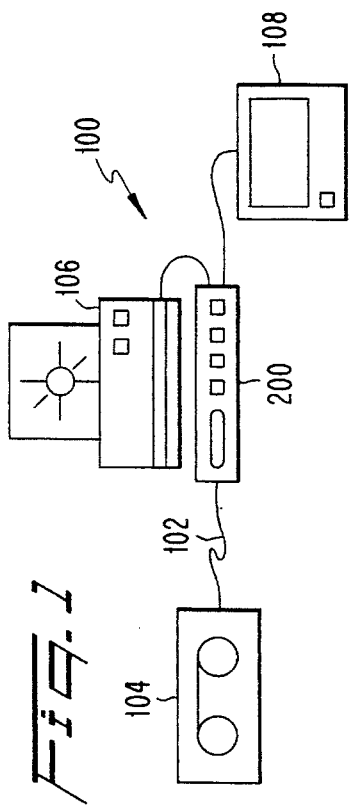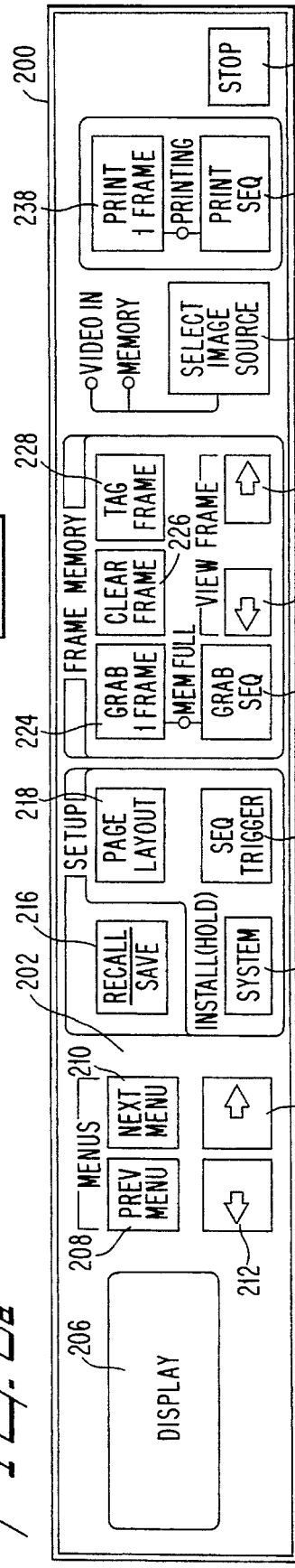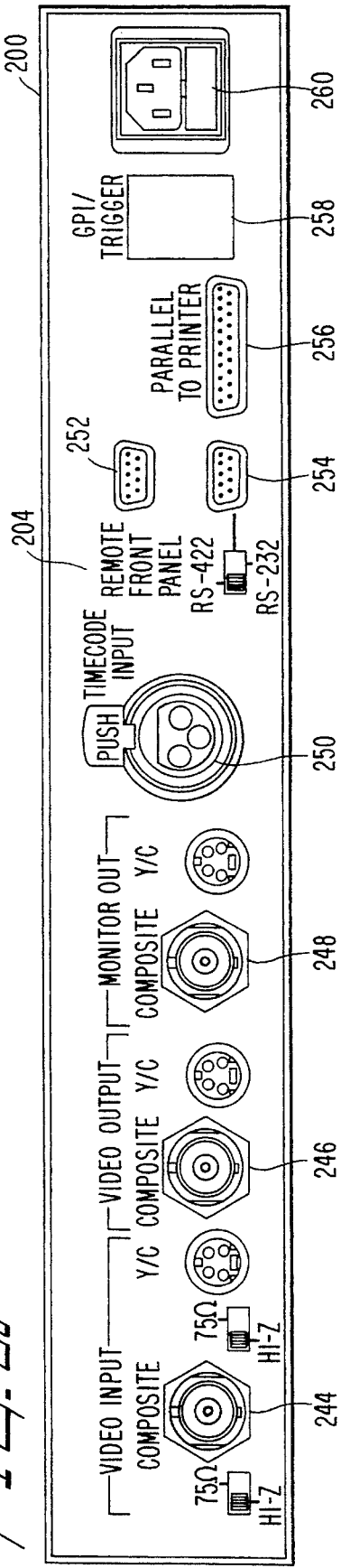

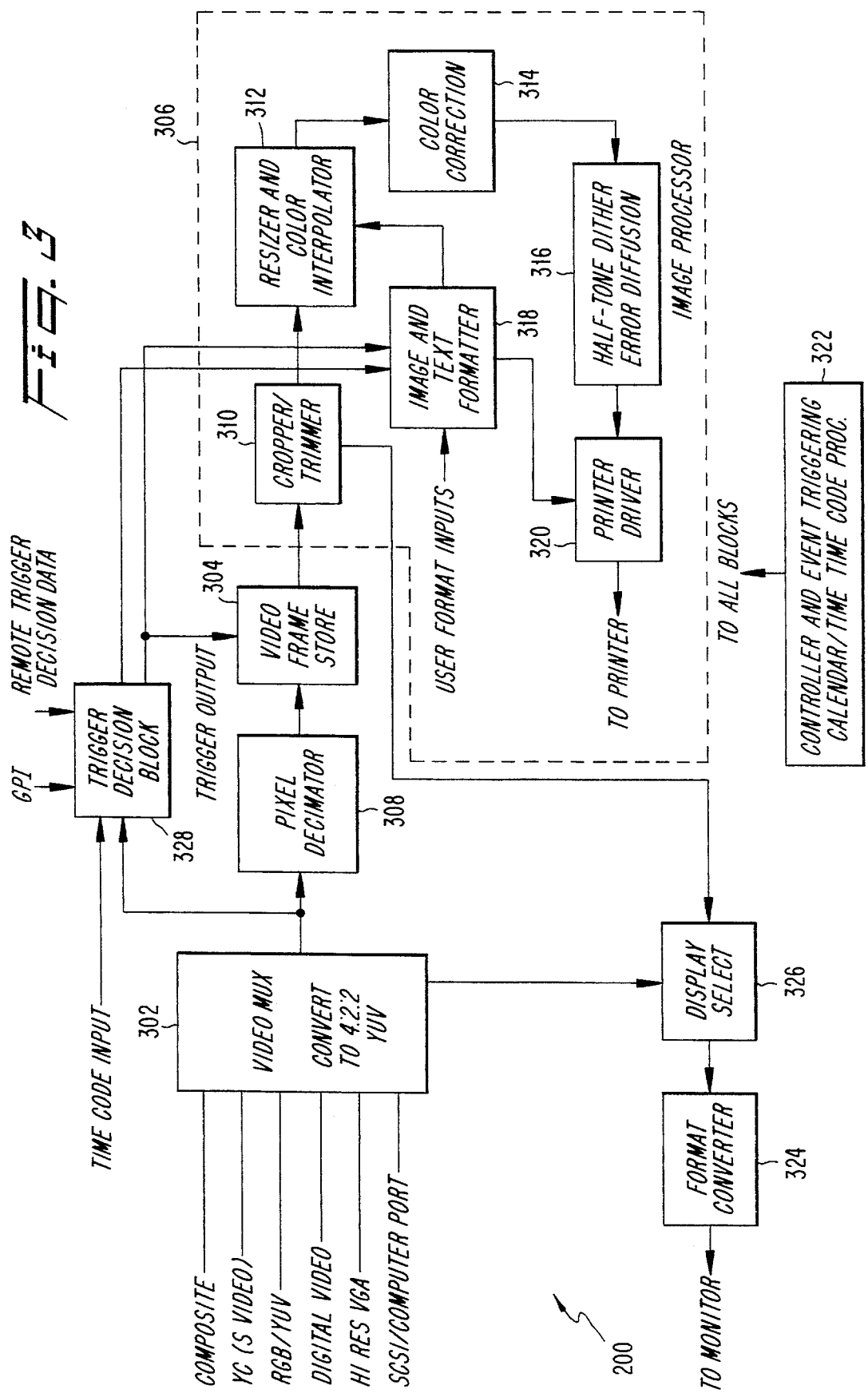

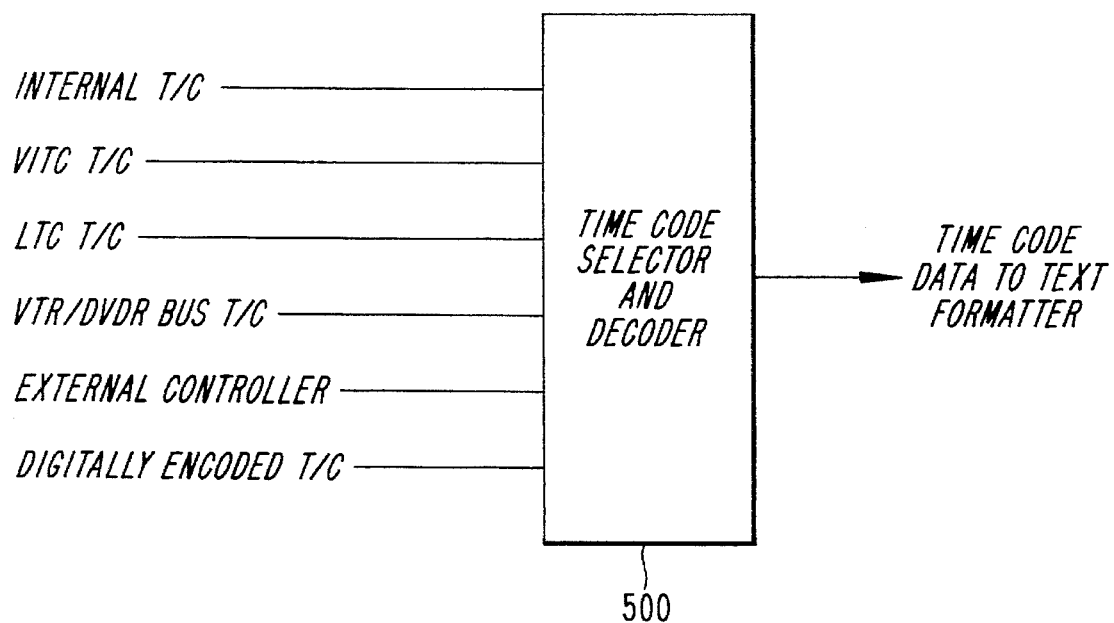

METHOD AND APPARATUS FOR MANAGING AND INITIATING VIDEO CAPTURE AND PRINTING

BACKGROUND OF THE INVENTION

1. Field of the Invention

The present invention relates generally to video printing, and more particularly, to printing video images on a printable medium.

2. State of the Art

Video printers for producing photographic-like images from a video input are known. These devices produce high resolution images on a medium such as thermal paper.

For example, a video printer is described in a brochure entitled, "Color Video Printer UP-5100/UP5150" available from Sony Corp. A brochure entitled, "Near Photographic Quality Color Prints From A Variety of Video Sources" describes a Color Video Printer UP-3000 also available from Sony Corp. The video printers as described in these brochures are directed to providing high quality prints of video images on photographic-like paper. A brochure entitled, "CP-110U Color Video Printer," and a brochure entitled, "CP-210U Large Format Color Video Printer," both available from Mitsubishi, describe similar devices for producing high resolution prints of video images on photographic-like paper.

Despite their apparent appeal, conventional video printers have only realized limited commercial use. This is because conventional video printers reflect the trend to focus on producing high resolution prints of near photographic quality without regard to commercial practicality. Accordingly, conventional video printers suffer significant drawbacks which are believed to have resulted in their commercial impracticality. For example, in addition to being expensive to purchase and use, conventional video printers can not accurately capture a given video frame; rather, activation of a print button on the video printer results in a capture and print of whatever frame happens to be in a frame buffer at a given time.

In general, the mechanism used to capture a frame of video data is typically a print key which acts as a command to store a frame of an input video signal, with the frame which is stored corresponding to the point and time at which the command is recognized by the video printer. A conventional video printer captures a video image (e.g., NTSC, PAL, SECAM, VGA format in either analog or digital), processes the video image for a target printer mechanism and prints the video image on photographic-like paper.

Because the mechanism used to capture a frame of the input video signal is relatively inaccurate, numerous costly photographic-like prints must typically be obtained before a desired frame is captured and printed. Thus, conventional video printers are extremely limited in their usefulness since they can only respond to a relatively inaccurate user activated control button.

SUMMARY OF THE INVENTION

Accordingly, the present invention is directed to reversing the trend in conventional video printing by providing a cost-effective, flexible processing apparatus which is independent of the printing device and which can respond to any of numerous highly accurate trigger signals for capturing a video image. Exemplary embodiments can be used with any conventional computer printing device to provide plain paper prints of video images and to provide an identifier as a visual indication of the type of trigger used to capture the video image. By focusing on optimizing cost-effectiveness and system flexibility rather than providing high resolution photographic quality prints, the present invention can provide video printing features never before realized.

The ability to accurately capture and print selected sequences or a multiplicity of video images provides an opportunity to present and organize the video imagery in ways most useful to video editors, producers, and graphic artists. Further, by accurately encoding certain trigger information in bar code or similar form on the printable medium, the video hardcopy output becomes a time-saving tool for non-linear editing on paper. Textual, numerical, and graphically encoded trigger information, such as time code data (as part of the image layout and formatting), can be used to increase productivity throughout the entire video production process. The accurate capture and printing of a video image on plain paper, with images presented in a useful manner, can significantly increase the productivity and communication ability of video professionals, leading to higher profits and improved customer satisfaction.

Generally speaking, the present invention relates to a method and apparatus for processing an input video data stream comprising the steps of: receiving the input video data stream; and automatically controlling processing of at least a portion of a video frame in response to a predetermined condition of the input video data stream.

BRIEF DESCRIPTION OF THE DRAWINGS

The present invention can be further understood with reference to the following description and the appended drawings, wherein like elements are provided with the same reference numerals. In the drawings:

FIG. 1 shows an exemplary embodiment of a system which includes an apparatus for processing an input video data stream in accordance with the present invention;

FIGS. 2a–2b show an exemplary embodiment of the video processing apparatus illustrated in FIG. 1;

FIG. 3 illustrates a functional block diagram of the FIG. 2 video processing apparatus;

FIG. 4 illustrates an exemplary time code selector and decoder for use in the FIG. 2 apparatus;

DETAILED DESCRIPTION OF THE PREFERRED EMBODIMENTS

Figure 5:
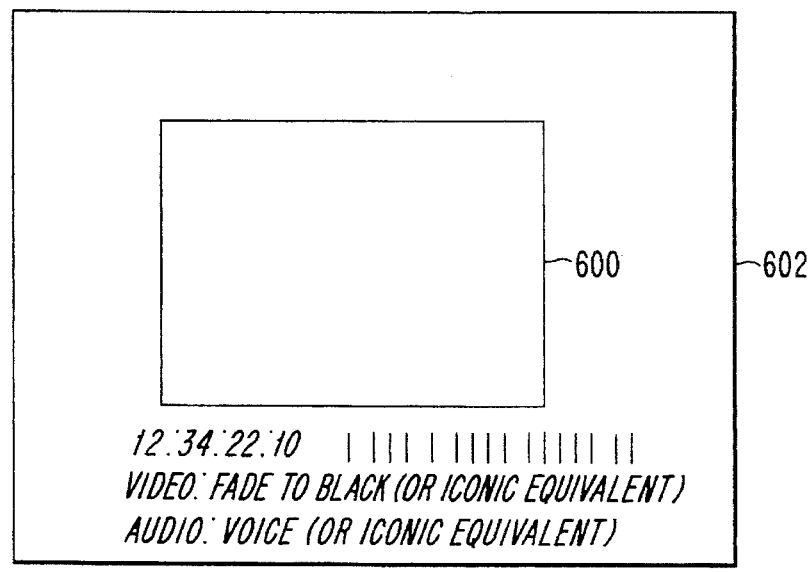
FIG. 5 illustrates an exemplary video image print in accordance with an exemplary embodiment.

FIG. 1 shows an exemplary embodiment of a system 100 which includes an apparatus 200 for processing a video data stream received via an input 102 from a video source 104. The video source 104 can be any video signal producing device, such as a video cassette recorder (VCR), a video tape recorder (VTR), a laser disc, a surveillance camera, a videocamera (e.g., camcorder), any television (TV) signal producing device (e.g., TV monitor), a video switcher or router, any imaging device (e.g., ultrasound imager), any computer/workstation device, any videoconferencing device, any compact disc device (e.g., compact disc read-only memory (CDROM)), and so forth. The FIG. 1 system is further illustrated as including a printing device 106 (e.g., any standard printer) and an optional video monitor 108.

Although the FIG. 1 processing apparatus 200 is shown as a stand-alone hardware element, those skilled in the art will appreciate that this is by way of example only. The processing apparatus can be configured as a software component of the FIG. 1 system, as an integrated circuit (IC) card which can be plugged into a computer, a workstation or a printer, or can be configured as an integrated subsystem inside a printing device. The FIG. 1 processing apparatus 200 can be interfaced to the printing device via a parallel or serial interface. The printing device can be used to provide a hardcopy print of a video image received via the input video data stream.

FIGS. 2a and 2b show a more detailed diagram of the front and back panels, 202 and 204, respectively of an exemplary embodiment of the video processing apparatus 200. The front panel 202 represents a user interface which includes input means from which trigger output signals can be obtained and a display (e.g., a fluorescent display) for displaying information associated with use of keys on the interface. The front panel 202 includes menu keys 208, 210, 212 and 214. The menu keys provide the user quick access to setup parameters when, for example, configuring the FIG. 2 apparatus for use with a particular video source, printer and/or monitor.

The menu key 208 and the menu key 210 allow the user to scroll vertically between menu items to examine either a previous menu item or the next menu item, respectively. These keys can also be used to scroll vertically through a particular menu list. The arrow menu keys 212 and 214 permit the user to change the setting of any given menu item once a particular menu item has been selected.

The front panel 202 also includes setup keys 216, 218, 220 and 222. A recall/save setup key 216 permits the user to recall a previous setup, such as a factory preset setup or a setup previously saved by the user (e.g., a setup which includes a particular printing device). The user can scroll through plural, previous stored setups using the menu keys, and then select a desired setup from memory.

A page layout setup key 218 allows the user to control the size, position and format of one or more video images which are to be printed on a page of printable media. For example, pre-defined page formats can be stored and accessed via the page layout setup key to print video images in storyboard, edit, log, tile or single image formats. Further, customized text can be printed at any location on a printable medium along with the printed video image or images. In operation, the page layout setup key 218 can be selected, after which the menu keys 208–214 can be used to sequence through menu items such as: page format (e.g., number of video images per page of printable medium), image size, position of image, position of textual information associated with image, headers, time stamp information, time code information and page numbers. Using the arrow menu keys 212 and 214, specific characteristics under each of these headings can be selected (e.g., any one of a number of preset image sizes can be selected).

A system/install setup key 220 can be used in conjunction with the menu keys to set various system parameters. For example, upon activating the system key, the menu keys can be used to set the video source format (e.g., composite; Y/C; RGB; Betacam; Mii; YUV; Society of Motion Picture and Television Engineers (SMPTE); European Broadcasting Union (EBU); 4:2:2; 4 fsc and so forth), resolution of video input, whether to capture a video image in color or monochrome, which fields of a given frame should be captured (e.g., A and B, A only, B only), whether to printout in color or monochrome, time code source (e.g., internal, vertical interval time code (VITC), longitudinal time code (LTC), remote, none), set parameters for: hue; saturation; contrast; brightness (e.g., each of which can be variable, and set by incremental step adjustments using the menu keys 212 and 214), and number of copies of the video image.

When the system/install setup key 220 is held down into its install state, the menu keys can be used to select parameters which remain constant within a given setup, such as time and date, printer model and language. For example, in operation the menu keys can be used to scroll through menu items such as printer type, units (e.g., English or metric), paper size of printable medium (e.g., letter, legal and so forth), paper type (e.g., plain, glossy, transparency and so forth), header language (e.g., English, German, Japanese and so forth), baud rate (e.g., any baud rate within a given range, such as a range up to 38400 bits per second or greater), parity (e.g., none, odd, even, zero, one, ignored), data bits (e.g., 8 data bits), stop bits (e.g., one, two and so forth), pace (e.g., whether signal acknowledgements will be required), time, month, day and year.

A sequence trigger setup key 222 can be used in conjunction with the menu key to select from among a wide range of flexible triggering modes (i.e., variety of trigger output signals for initiating storage of a video image, or terminating a continuous storage of video images). For example, a general purpose interrupt (GPI) trigger accessible via the back panel 204 (FIG. 2b) can be selected to provide a trigger output signal. Other exemplary menu items can include a manual trigger, a trigger based on a time interrupt, a detected scene change in the input video data stream, a combination of a time interrupt and a scene change, and so forth. Alternately, the sequence trigger setup key 222 can be used to select a trigger at time intervals which are set via the menu keys (e.g., trigger every predetermined period of time, such as from 1 to 60 seconds). The sequence trigger setup key can be used to initiate an action such as grabbing of a frame, grabbing of a sequence of frames, printing of a frame, printing of a sequence or stopping the printing of a frame.

The front panel 202 of FIG. 2a also includes a plurality of operational keys 224, 226, 228, 230, 232 and 234. The grab one frame operational key 224 permits the user to grab, or capture a single video image. Afterward, the image can be viewed, resized and printed as often as desired on any available size of paper. In operation, the grab one frame operational key controls the capture of a single frame from a video data stream input and adds this frame to the end of a video frame store (i.e., frame memory such as a first-in first-out (FIFO) video random access memory (VRAM).

The grab sequence operational key 230 permits the user to grab a sequence of frames according to a sequence trigger setting previously established using the sequence trigger setup key 222. For example, if the sequence trigger setup key is set to a minimum, consecutive frames can be grabbed upon activation of the grab sequence operational key. If a circular frame memory is used, the frame memory is overridden in a first-in first-out manner.

A clear frame operational key 226 can be used to delete a frame from the frame memory. Alternately, this operational key, if depressed for a predetermined period of time (e.g., ½ second), can be used to clear the entire frame memory. For example, when the FIG. 2 apparatus is in a video data stream input mode, pressing of the clear frame operational key 226 can be used to clear the most recent frame of video data grabbed.

A tag frame operational key 228 can be used to establish a print order so that frames can be printed from the frame memory in any order selected by the user. For example, pressing of the tag frame operational key can be used to mark specific video images to be printed during a print sequence operation. Activating the tag frame operational key for a predetermined period of time (e.g., ½ second) can be used to erase all frames that had been tagged.

Frame review operational keys 232 and 234 can be used to browse through frames previously stored in the frame memory so that the user can print the video images desired. For example, pressing of these frame review operational keys, each of which is designated by an arrow, allows the user to scroll forward or backward through the frame memory. As each frame is viewed, it can be tagged using the tag frame operational key 228.

In addition to the operational keys, the front panel 202 includes specialized function keys. One of these specialized function keys is labeled as a select image source function key 236. This key can be used to print video images from a live video input or from the frame memory. By activating the select image source function key, the source of the video image to be printed can be toggled between the video input and the frame memory. Further, a display monitor, such as the monitor 108 of FIG. 1, can be toggled according to the selected image source to display the image source selected.

A print one frame function key 238 and a print sequence function key 240 can be used to print single frames or complete sequences of video images. For example, the print one frame function key can be used to print a single frame on a printable medium either from a frame memory or from a live video input, depending on the setting of the select image source function key. The print sequence function key can be used to print a sequence of frames on one or more sheets of printable medium according to a setting of the image format (i.e., page layout) and trigger mode (i.e., sequence trigger) setup keys. Again, a sequence of video images can be printed either from a live video data stream input or from a frame memory.

A stop function key 242 is also provided. This function key can be used to cancel a print. Further, this key can be used to return the user to a machine ready state when the user has previously activated a menu operation. When the stop function key is activated, any changes previously made in using any of the menu, setup or operational keys can be saved. When in an operating mode, the stop function key can be used to exit a working process, such as a grab sequence operation or a printing operation.

Having described an exemplary embodiment of a processing apparatus front panel, a discussion will now be provided of the back panel 204 illustrated in FIG. 2b. The back panel 204 includes a video input section which can be adapted to receive any video data stream input format. For example, the exemplary embodiment of FIG. 2b includes a composite video data stream input 244. The video input 244 of FIG. 2b is illustrated as a composite and Y/C video input. For example, a composite/S-video can be input via this video input. The back panel also includes a composite and Y/C video output 246, and a composite and Y/C monitor output 248. The composite and Y/C monitor outputs allow the user to view video images on relatively inexpensive preview monitors, such as the video monitor 108 of FIG. 1. Although reference has been made to composite and Y/C video inputs and outputs, those skilled in the art will appreciate that the FIG. 2 apparatus can be readily reconfigured to accommodate any video format, such as component/RGB, or serial digital 4:2:2 video formats. Further, all video inputs and outputs can be readily adapted to accommodate 525/625 NTSC and PAL video signals.

The back panel also includes means for inputting signals from which trigger output signals can be obtained. For example, a time code input 250 is provided on the back panel 204 of FIG. 2b. The time code input can be used to derive a trigger output signal. Further, the time code input permits the user to selectively print a time code with video images. Such a time code, when printed with a video image, can be used for video indexing and archiving.

The back panel 204 also includes, as part of the input means, a remote front panel interface 252 to provide full access to all front panel features over a dedicated RS-422 bus. Such a feature permits ready interfacing of an edit room in a video production house to a machine control room. An RS-422/RS-232 remote control port 254 can be used to provide remote programming of all front panel parameters. Such a feature can be used to integrate the FIG. 2 apparatus to third-party controllers. A parallel output printer interface 256 can be used to interface the FIG. 2b apparatus to any conventional printer or plotter (e.g., any portable printer such as those available from Hewlett-Packard Co.).

A general purpose interrupt input 258 of the signal input means can be used to provide remote triggering from any source (e.g., an edit controller, a contact closure or a transistor-transistor logic (TTL) line driver). The general purpose interrupt input can, in accordance with exemplary embodiments, be optically coupled, and can be used to receive parallel inputs from multiple sources.

The back panel 204 also includes a power supply input 260 to provide a power source through all internal components.

Having discussed an exemplary embodiment of a processing apparatus 200 with respect to a user interface and input/output (I/O) features, reference will now be made to FIG. 3 to disclose exemplary internal operations thereof. FIG. 3 illustrates an exemplary functional block diagram of a processing apparatus 200. As illustrated in FIG. 3, a video input data stream of any available video source (e.g., composite, Y/C (S-G), RGB/YUV, digital video (e.g., 4:2:2), high resolution VGA, SCSI/computer port and so forth) are input to a video multiplexer 302.

The FIG. 3 apparatus processes an input video data stream received via the video multiplexer 302. In accordance with exemplary embodiments, the FIG. 3 apparatus includes a buffer, such as a video frame store 304, for storing at least a portion of one frame of the input video data stream as printable image data. The video frame store 304 can, for example, be an expandable video random access memory (VRAM) simms, which can be installed in, for example, 2 Megabyte increments.

The video multiplexer 302 can include a converter for converting at least a portion of a frame from a first video data format in which the video data stream is received to a second video data format (e.g., convert a composite format to a YUV format). Such conversion techniques are well known and need not be described in detail.

A data compressor 308 can be provided for selectively reducing an amount of stored video data used to represent a frame of the input video data stream in the video frame store 304. The data compressor can implement any conventional video compression algorithm. Further, the data compressor can include any known pixel decimator (e.g., a Philips 7194 decoder resizer control) for reducing the number of pixels used to represent a video image by, for example, selectively eliminating pixels (e.g., by selecting one of four pixels to represent the four pixels, eliminating the other three to thereby reduce the number of pixels from four to one for each four pixel location).

The processing apparatus 200 further includes a processor 306 for processing at least a portion of a frame stored in the frame buffer to correlate at least a portion of the frame to the input video data stream using at least one identifier. In accordance with an exemplary embodiment, the processor can include a means for selectively trimming at least a portion of the frame stored in the video frame store 304. For example, the selective trimming means can be a conventional cropper/trimmer 310 which is used to remove edge pixels of a video image. In an exemplary embodiment, the user can crop a video image to maintain a predetermined aspect ratio with each incremental crop.

Further, the processor 306 can include means for scaling a printable video image associated with printable image data of at least a portion of a frame. In an exemplary embodiment, the scaling means can be any conventional resizer and color interpolator 312.

The exemplary FIG. 3 processor 306 also includes a means for correcting color of the printable image, represented by a color correction 314. The color correction 314 can be any conventional color corrector for providing a corrected video image which satisfies desired color conditions. The processor 306 can also include an image corrector 316. In an exemplary embodiment, the image corrector 316 can be used to achieve improved printing resolution (e.g., using established methods of half-tone, dither and error diffusion).

The processor 306 includes means for formatting a video image and textual or iconic information for printing on a printable medium. In an exemplary embodiment, a formatting means is represented as an image and text formatter 318 which is responsive to a user format input selected via the FIG. 2a front panel of the processing apparatus 200. Outputs of the image and text formatter 318 can be supplied to any conventional printer driver 320 used to drive any conventional plain paper printer.

Control inputs to all functional blocks of the processor 306 are illustrated by the input block 322 which can function as an input/output interface for the features illustrated in FIGS. 2a and 2b. The input block 322 can provide such inputs as controller and event triggering, calendar/time inputs and time code processing inputs.

A video image from any of the functional blocks in FIG. 3 can be displayed for review. For example, a cropped video image obtained from the cropper 310 can be provided to a display format converter 324 to drive any conventional monitor. A display select 326 can be used to drive the format converter from the cropper/trimmer 310 or from the video input so that the user can selectively view the input video data stream or the cropped video image received from the video frame store 304.

In accordance with the present invention, the processing apparatus 200 of FIG. 3 includes a trigger decision block 328. The trigger decision block is illustrated as a separate functional block in FIG. 1 to highlight this feature. However, the functions of this block can also be included in the input/output interface block 322.

The trigger decision block 328 is shown to receive various sources of input information including, for example, a time code signal input (e.g., SMPTE time code or similar code received via time code input 250 of FIG. 2b), an active video input data stream with an optional audio component (e.g., received via the video data stream input 244 of FIG. 2b), a general purpose interrupt signal (e.g., received via GPI input 258 of FIG. 2b); and a standard command from a print initiator (e.g., print function keys 238 and 240 of FIG. 2a) or a remote command (e.g., received via remote control port 254 of FIG. 2b). In response to receipt of an input trigger signal, the trigger decision block initiates an output signal for generating a trigger indicator upon occurrence of a predetermined set of input conditions established by the user.

A trigger output signal of the trigger decision block is directed to the video frame store 304 to initiate or terminate a capture of at least a portion of a video frame therein. Further, the trigger output signal is directed to the processor 306 so that image and text formatting can be performed on the basis of the trigger selected (e.g., print the type of trigger which was used to capture a video image next to the video image on a printable medium).

Trigger decision data is also output from the trigger decision block 328 as a decision data signal. Again, this decision data signal can be input through the image and text formatter 318 of the processor 306 so that information regarding a predetermined condition (e.g., time code information) used to initiate the trigger can, if desired, be printed on a printable media with a video image.

In operation, a trigger output signal produced in response to a predetermined trigger condition indicates to the processing apparatus when to act, thereby controlling (e.g., initiating or terminating) a particular function (e.g., storage, or capture, of at least a portion of a video frame). As referenced herein, the phrase "controlling storage" refers to any manner by which at least a portion of data included in the input video data stream can be saved, either in a memory (such as the frame store) or directly on a printable medium. The trigger output signal can control (e.g., initiate or terminate) a frame store capture of a specified number of frames.

Those skilled in the art will appreciate that a trigger condition for initiating the capture of at least a portion of a frame of a video image can be ongoing during the printing of other previously stored video images, or during the course of printing live video images obtained from the input video data stream. A single trigger output signal can be used to cause one or more portions of frames to be captured or can be used to discontinue the capturing of successive frames. A more detailed discussion will now be provided of exemplary trigger conditions which can be used by the trigger decision block 328 in accordance with exemplary embodiments of the present invention.

In accordance with exemplary embodiments, the video frame store 304 of the exemplary FIG. 3 embodiment can be triggered in response to the trigger output signal of the trigger decision block 328 when any one or more of a variety of conditions occurs, as specified by the user. For example, a trigger output signal can be generated in response to a predetermined condition of the input video data stream, or in response to an unlimited number of external conditions or combinations thereof.

Numerous predetermined conditions of the input video data stream can be used to initiate a trigger output signal. As referenced herein, a predetermined condition of the input video data stream can be any condition which bears a relationship to or which is derived from the input video data stream. For example, a trigger output signal can be generated when a predetermined time code value supplied by the user matches a time code value received within the video input. A time code value derived from a video input can, for example, be a signal such as the vertical interval time code of a video signal or a longitudinal time code.

Other characteristics of the input video data stream can also be used to initiate a trigger output signal. For example, a trigger output signal can be generated when a set amount of motion (or lack thereof) is detected within the input video data stream. The criteria used to determine when an amount of motion exists or does not exist can be defined by the user in accordance with any conventional motion detecting algorithm. For example, motion can be detected between two consecutive or non-consecutive frames by comparing threshold values for each of the pixels included in the frames. When a predetermined number of pixels have changed by a value corresponding to the threshold value (e.g., intensity), the processing apparatus can make a determination that motion has occurred between the two frames and output the trigger signal.

Further, pixels of consecutive or non-consecutive frames can be examined to detect a predetermined change in video content. For example, frames of the input video data stream can be examined to determine when a set number of video frames which are black have been received, and produce the trigger output signal upon receipt of the first non-black frame. A black frame can be detected as one in which pixels use to compose the frame lack color or luminance. A trigger can be generated in response to an indicator of a video effect associated with at least a portion of a frame. For example, the trigger output signal can be generated in response to a detected "fade to white", a "fade from white", a "fade to black", a "fade from black", a "cut" (scene change), a "dissolve scene", a "pan", a "zoom", an "overlay", a "wipe", a "special effect", and so forth.

For example, a scene change can be used as a trigger output signal. For purposes of this discussion, a scene change can be defined as the first frame which occurs upon rapid transition between two different scenes (i.e., a scene cut or dissolve). Any conventional scene detector algorithm can be used to detect occurrence of a new scene, and can be operated in a fashion similar to that described above with respect to motion detection among frames. Such trigger output signals can be used for indexing live or pre-recorded video images printed on a printable medium.

In addition, a trigger output signal can be generated based on audio content of the input video data stream. For example, a trigger output signal can be generated when the audio content associated with at least a portion of a frame of the input video data stream satisfies various predefined conditions. Such conditions can include, for example, absence of an audio signal (e.g., audio is silent) for a set period of time; detection of audio for a predetermined period of time; detection of predefined audio tones or frequencies within the audio content; and detection of predefined speech, music or a combination pattern being received or not received.

Other characteristics of the input video data stream which can be used to initiate a trigger output signal include generating a trigger when the received video signal has or does not have a predefined signal state. For example, a signal state which can be used to initiate a trigger output signal can include: (1) a digital video signal with a detected error condition (e.g., an error detected in accordance with the error detection and handling (EDH) defined by SMPTE document RP:165) such that frame capture can be initiated upon detection of a "bad" frame of video to provide quality control; (2) any predefined anomalous signal conditions such as a signal overshoot, undershoot, out of range sync pulses and so forth; and (3) any predefined standard signal condition such as a signal level or levels, a signal color or colors, or other signal conditions of similar nature.

Further, a trigger output signal can be generated when a particular video image obtained from at least a portion of a video frame has been determined to match or not to match a predefined frame previously stored in a reference memory of the image processor by the user. Thus, a trigger output signal can be initiated on the basis of scene content previously stored in memory by the user.

In addition to detecting predetermined conditions of the input video data stream, any one or more external conditions can be used to provide trigger output signals. For example, a trigger output signal can be generated upon receipt or lack of receipt of an external general purpose interrupt, a signal which has achieved widespread use in production studio systems.

A trigger output signal can also be generated when an interval timer which has been preset by the user elapses over time. For example, an internal timer in the image processor can be used to count predetermined time intervals and then automatically initiate a trigger output signal upon the completion of each such interval. In response, the image processor and video frame store can be controlled to selectively capture a video image upon occurrence of each such interval.

A trigger output signal can also be generated in response to a predefined command received via a remote control interface. Further, a detected match between an externally supplied time code value and a predetermined time code value supplied by the user can be used to initiate a trigger output signal.

Of course, conventional techniques can also be used to establish a trigger. For example, a trigger can be generated upon detection of a true time value as computed by an internal clock/calendar, matching a predefined user supplied time. Thus, a video image can be captured at a particular time defined by the user. Further, a trigger output signal can be generated in response to activation of a conventional print key.

As previously mentioned, a trigger output signal can of course be generated upon detection of any one or more of the foregoing events. For example, a trigger may be generated when a time period matches a predetermined value and audio is detected to be silent for a predetermined period of time.

In accordance with the present invention, an input video data stream can be processed by selecting at least a portion of a frame of the input video data stream as printable image data, and by processing the selected portion to correlate this portion of a frame to the input video data stream using at least one identifier as described in commonly assigned, co-pending U.S. application Ser. No. 08/143,049, Attorney Docket No. 1093784-1, entitled, "Method and Apparatus for Processing An Image In A Video Printing Apparatus," filed Oct. 29, 1993, the disclosure of which is hereby incorporated by reference in its entirety.

In accordance with the present invention, an identifier can be stored and subsequently printed with a video image to identify the predetermined condition (e.g., the trigger) used to capture a given video image. For example, a time code such as an Society of Motion Pictures and Television Engineers or European Broadcasting Union time code can be associated with each stored video image in the form of: hh:mm:ss:ff, where h=hours, m=minutes, s=seconds and f=frames. The time code associated with each video image can be printed on or near each video image to provide a location reference back to the master source (e.g., a video tape or disk) from which the input video data stream was received. A text positioning variable $T_{xy}$ can be used to determine the relative x-y position of the time code information on the printable medium (e.g., next to the video image). The time code can be used for recording, archiving, indexing, editing and retrieving video.

Trigger information can be derived and printed from any of one or combination of the numerous trigger sources described above. For example, trigger sources include an internal time code generated by an internal clock or frame counter of the processing apparatus, a vertical interval time code which is read from the vertical interval of an incoming video signal, a longitudinal time code which is read from an external audio-frequency time code input, a remote time code read over an electronic bus (e.g., an RS-422 bus from a video tape recorder, or a digital video disk recorder, a time code read over an electronic bus from a computer controller or the like, or a time code digitally encoded onto a digital video signal such as a serial digital signal conforming to SMPTE 259M.

The exact trigger output signal used for capturing a video image in the frame memory store can be selected automatically, using a default to an available trigger of the processing apparatus 200 or to a trigger set manually. Where a time code is used as a trigger output signal, a user input received via the input block 322 of FIG. 3 can be used to activate a time code selector and decoder included in either functional block 322 or in the trigger decision block 328.

A time code selector and decoder 500 is illustrated in FIG. 4 with respect to the exemplary time code information discussed previously. Outputs of the time code selector and decoder illustrated in FIG. 4 can be input as time code data to the image and text formatter 318 of FIG. 3 so that time code information can be printed in a location proximate to each video image.

For example, in addition to outputting time code data to the image and text formatter 318 of FIG. 3, a code can be used to indicate to the user the type of time code associated with the video image. Exemplary coding which can be used for the various time codes is: "I" for internal time code, "V" for VITC time code, "L" for LTC time code, "B" for bus time code from video tape recorder or digital video disk recorder remote control bus, "R" for time code from remote external controller bus, and "D" for digitally encoded time code. By using the set up keys, the user can, for example, specify that time code information be printed immediately to the lower left corner of a video image printed on a printable medium.

In accordance with an exemplary embodiment, the type of trigger output signal can be encoded into a bar code format using any conventional industry-standard methodology for bar coding. The bar code can then be placed anywhere on the printable medium using the text positioning variable $T_{xy}$. Thus, the user can establish a print format for the printable image data which includes the frame of the input video data stream and the trigger identifier in textual, numeric, iconic and/or bar code form, then print the printable image data on a printable medium in accordance with this print format.

The trigger output signal used to initiate or terminate storage of a video image can be input as trigger decision data to the image and text formatter 318 of FIG. 3 so that the trigger decision data (e.g., the data used to produce the trigger output signal) and an indication of the trigger used can be printed in a location proximate to each video image as illustrated in FIG. 5. In FIG. 5, a video image 600 is illustrated with trigger information on a printable medium 602. For example, trigger information represented by time code information is located to the lower left hand corner of the video image 600. The time code data can also be encoded into a bar code format and printed with the video image as illustrated in FIG. 5. Of course, other information can be printed with the video image, such as video and audio data associated with the particular video image printed.

Figure 6:
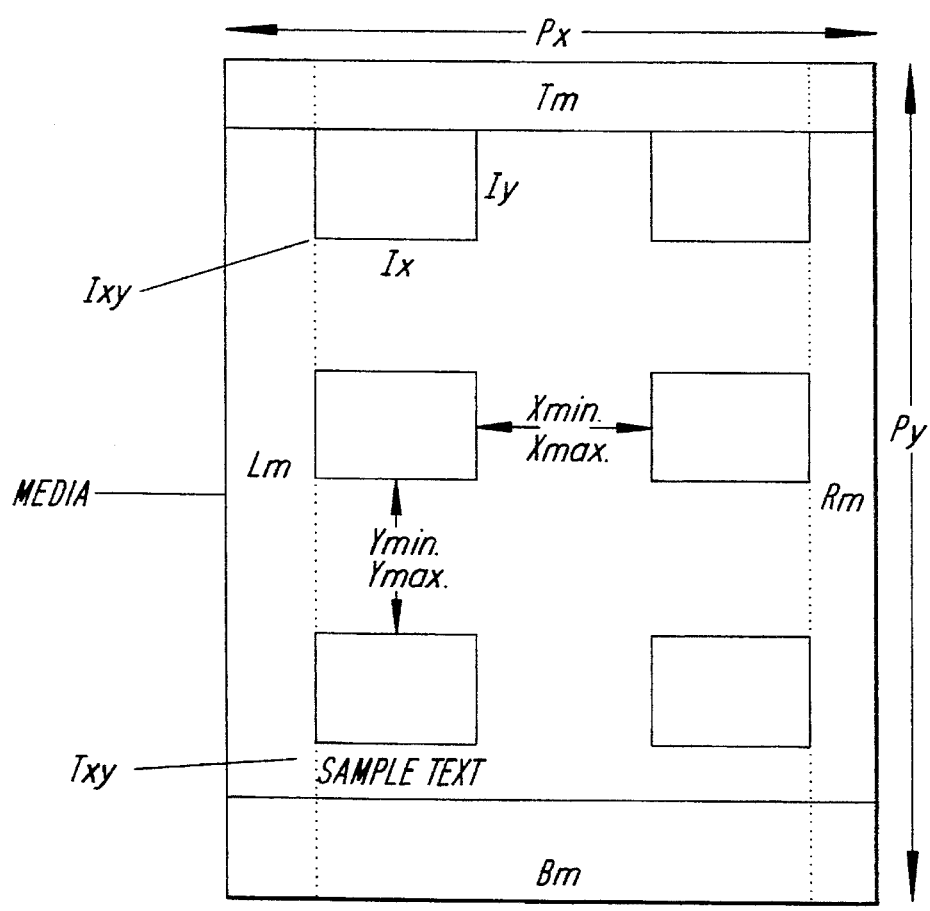
FIG. 6 illustrates an exemplary print format for a sheet of a printable medium in accordance with an exemplary embodiment.

FIG. 6 illustrates an example of a sheet of printable medium which can be formatted in accordance with exemplary embodiments of the present invention to accommodate one or more video images. The exact formatting for a particular sheet of printable medium can be set by the user via the page layout setup key 218 (FIG. 2b).

As illustrated in FIG. 6, various dimensions can be set by the user such as an x-axis horizontal dimension of the printable media ($P_x$), a y-axis vertical dimension of the printable media ($P_y$), a left margin ($L_m$), a right margin ($R_m$), a top margin ($T_m$), a bottom margin ($B_m$), the positioning variable $T_{xy}$ for establishing an x-y position of an arbitrary icon or line of text of specified font (F) and point size (P) with $T_{xy}$ being justified right, center or left with respect to the bottom of text, and x-y position of an image of arbitrary size as referenced, for example, to any corner of the image, the center or any location specified by the user ($I_{xy}$), a dimension of an image in the horizontal x-axis ($I_x$), and a dimension of an image in the vertical y-axis ($I_y$). Further, the user can specify minimum and maximum allowable spaces between plural images to be printed on a printable medium. For example, the user can specify a minimum allowable space between images in the horizontal x-direction ($X_{min}$), a maximum allowable space between images in the horizontal x-direction ($X_{max}$), a minimum allowable space between images in the vertical y-direction ($Y_{min}$), and a maximum allowable space between images in the vertical y-direction ($Y_{max}$). In addition, the user can specify a maximum printable area on the printable medium as defined by variables $L_m$, $R_m$, $T_m$ and $B_m$, and so forth.

For most video images, the user can specify that $3 \times I_x = 4 \times I_y$ to preserve a 4×3 aspect ratio. However, the cropping/trimming feature can be used to change the aspect ratio of an image if desired. Those skilled in the art will appreciate that any format can be accommodated in accordance with the present invention and specified by the user during a setup operation, the foregoing discussion being by way of example only. Page layouts can be optimized to accommodate one or more video images independent of aspect ratio.

Those skilled in the art will appreciate that the exemplary embodiments described above are illustrative. For example, the processing apparatus 200 can be included in any of the system devices illustrated in FIG. 1. Indeed, those skilled in the art will appreciate that all of the FIG. 1 components can be combined into a single stand-alone unit if desired.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for processing an input video data stream comprising the steps of:

receiving the input video data stream; and automatically controlling processing of at least a portion of a video frame in response to a predetermined condition of the input video data stream, said step of automatically controlling further including at least one of the steps of:

controlling storage of said at least a portion of said video frame as a printable video image when a predetermined time interval has elapsed during receipt of said input video data stream;

controlling storage of said at least a portion of said video frame as said printable video image by comparing at least portions of at least two frames of said input video data stream;

comparing said at least a portion of said video frame to at least a portion of a pre-stored reference video frame to detect a match between said video frame and said reference video frame; and controlling storage of said at least a portion of said video frame as said printable video image upon detecting an audio signal associated with said video frame.

2. Method according to claim 1, wherein said step of automatically controlling further includes steps of:

inputting a predetermined time code value; and controlling storage of said at least a portion of said video frame as said printable video image when a time code value associated with said input video data stream matches said predetermined time code value.

3. Method according to claim 1, wherein said step of automatically controlling further includes steps of:

inputting a predetermined time code value; and controlling storage of said at least a portion of said video frame as said printable video image when a derived time code value from said input video data stream matches said predetermined time code value.

4. Method according to claim 3, further comprising a step of:

reading said derived time code from a vertical synchronization interval of said video data stream.

5. Method according to claim 3, further comprising a step of:

reading said derived time code from a longitudinal time code.

6. Method according to claim 1, wherein said step of comparing at least portions of at least two frames of said video data stream further includes a step of:

detecting changes in characteristics of pixels included in a first of said at least two frames relative to a second of said at least two frames.

7. Method according to claim 6, wherein said step of automatically controlling further includes a step of:

using said detected characteristic changes to indicate a scene change within said input video data stream.

8. Method according to claim 1, wherein said step of automatically controlling further includes a step of:

receiving a general purpose interrupt; and controlling storage of said at least a portion of said video frame as said printable video image in response to said general purpose interrupt.

9. Method according to claim 1, further comprising a step of:

controlling storage of said at least a portion of said video frame as said printable video image if a match exists between said video frame and said reference video frame.

10. Method according to claim 1, wherein said step of automatically controlling further includes steps of:

examining said at least a portion of said video frame to detect a predetermined signal state; and storing said at least a portion of said video frame when said predetermined signal state is detected.

11. Method according to claim 1, further comprising a step of:

receiving a control input; and controlling storage of said at least a portion of said video image when said predetermined condition exists and when said control input has been received.

12. Method according to claim 11, wherein said step of receiving further includes a step of:

receiving a general purpose interrupt as said control input.

13. Method according to claim 1, further comprising a step of:

controlling storage of said at least a portion of a video frame and information which identifies said predetermined condition.

14. Apparatus for processing an input video data stream comprising:

a buffer for storing at least a portion of a video frame of an input video data stream as printable image data; and a processor for automatically controlling processing of said at least a portion of the video frame in response to a predetermined condition of the input video data stream, said predetermined condition corresponding to at least one of an elapsed predetermined time interval during receipt of said input video data stream, a comparison of at least portions of at least two frames of said video data stream, a comparison of at least a portion of said video frame to at least a portion of a pre-stored reference video frame to detect a match between said video frame and said reference video frame, and detection of an audio signal associated with said video frame.

15. Apparatus according to claim 14, wherein said processor further includes:

means for formatting said printable image data of said at least a portion of the frame and an identifier of said predetermined condition for output to a printing device.

16. Apparatus according to claim 14, wherein said processor further includes:

means for inputting signals from which trigger output signals can be obtained in response to said predetermined condition.

* * * * *